(No Model.)

J. BRAUN.
PAWL AND RATCHET MECHANISM.

No. 281,662. Patented July 24, 1883.

WITNESSES:
R. P. Grant,
W. F. Kircher

INVENTOR:
John Braun,
BY John A. Diedersheim
ATTORNEY.

N. PETERS. Photo-Lithographer, Washington, D. C.

United States Patent Office.

JOHN BRAUN, OF PHILADELPHIA, PENNSYLVANIA.

PAWL-AND-RATCHET MECHANISM.

SPECIFICATION forming part of Letters Patent No. 281,662, dated July 24, 1883.

Application filed January 30, 1883. (No model.)

*To all whom it may concern:*

Be it known that I, JOHN BRAUN, a citizen of the United States, residing in the city and county of Philadelphia, State of Pennsylvania, have invented a new and useful Improvement in Pawl-and-Ratchet Mechanisms, which improvement is fully set forth in the following specification and accompanying drawings, in which—

Figure 1:
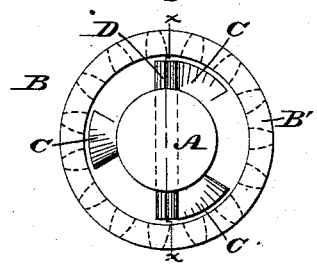
Figure 2:
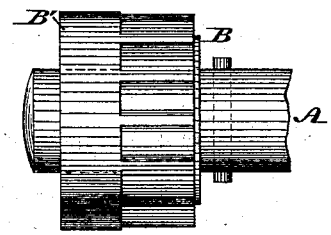
Figure 3:
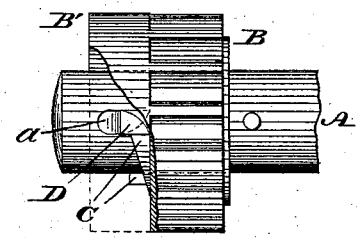
Figure 4:
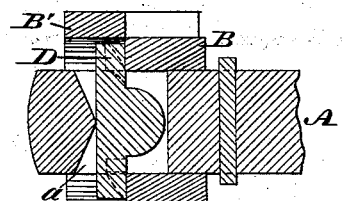
Figure 5:
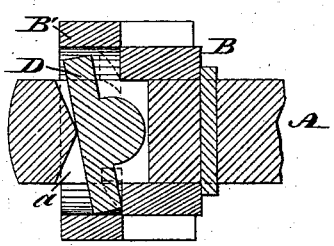

Figure 1 is an end view of a pawl-and-ratchet mechanism embodying my invention. Figs. 2 and 3 are side elevations thereof. Figs. 4 and 5 are sections in line $x$ $x$, Fig. 1, showing different positions of the mechanism.

Similar letters of reference indicate corresponding parts in the several figures.

My invention relates to an improvement in pawl-and-ratchet mechanisms, especially designed for a lawn-mower, to which the description of the invention will be limited, wherein when the mower is propelled in one direction the power of the wheels is transmitted to the cutter, and when propelled in the opposite direction, or run back, said cutter remains stationary.

The invention consists of a pinion fitted loosely on the driving-shaft and provided with a ratchet, with which engages a swinging pawl, whose bearings are on said shaft, the pinion having a flange, which overhangs the ends of the pawl, so as to dispense with a pivotal pin or bolt, the operation being hereinafter fully set forth.

Referring to the drawings, A represents a driving-shaft, to which the wheels of a lawn-mower are fixed, or with which said wheels are geared, so that the shaft is operated by the wheels of the mower, as usual in such cases.

B represents a pinion, which is mounted loosely on said shaft A, and has secured to or formed with one side thereof outwardly-projecting teeth C, forming a ratchet.

D represents a pawl, which is fitted in a recess, $a$, in the shaft A, so as to occupy a position adjacent to the ratchet C and engage therewith, said pawl being double-ended, so that when one end is moved outwardly the opposite end is accordingly moved inwardly, the pawl thus being adapted to ride freely over the ratchet in one direction of rotation of the shaft and engage with the shoulders or back of the ratchet-teeth when the shaft is rotated in the reverse direction. The rim of the pinion B is extended laterally, forming a flange, B', which overhangs or encircles the ends of the pawl D. This retains said pawl in position and permits it to oscillate without the employment of a pivot pin or bolt, the rapid and continuous motions of a pawl or with such pin or bolt soon wearing out the latter, which in the present case is obviated.

When the mower is moved in the direction toward the grass, the end of the pawl nearest to the back of one of the ratchet-teeth abuts against said back and engages therewith, whereby the pinion B and shaft A move as one, and the power of the mower-wheels is communicated through suitable gearing or mechanism to the cutter of the mower.

When the mower is run back or moved from the grass, the pawl D rides freely over the ratchet without imparting motion to the pinion B, whereby the cutter remains stationary or inoperative.

Should the pawl be made so that only one end projects, a spring will be employed to force said end inwardly against the face of the ratchet-teeth and side of the pinion; or the pawl may be made of two parts, each of which is forced inwardly; but a single double-ended pawl is preferred, as springs are avoided and greater strength is obtained, the advantage in each case being the unfailing engagement of the pawl with the back of a ratchet-tooth, the abutment solidly of the side of the pawl against the ratchet-tooth, in contradistinction to the abutment of the point of a pawl against such tooth, said point being liable to be broken off, and increased strength of the pawl, owing to its location within the recess $a$, the walls of which serve to brace said pawl and in a measure guard the same.

Having thus described my invention, what I claim as new, and desire to secure by Letters Patent, is—

1. A ratchet-and-pawl mechanism consisting of a ratchet connected on its side with a pinion which is loose on the driving-shaft, and a pawl which is fitted to said shaft and adapted to engage with and be disengaged from said ratchet, said pinion having a flange which overhangs the ends of said pawl, substantially as and for the purpose set forth.

2. A shaft, flanged pinion, ratchet, and swinging pawl, combined and operating substantially as and for the purpose set forth.

JOHN BRAUN.

Witnesses:
JOHN A. WIEDERSHEIM,
A. P. GRANT.